Feb. 17, 1931.　　　A. W. BRUCE　　　1,793,049
LOCOMOTIVE BOOSTER SUSPENSION
Filed June 1, 1929
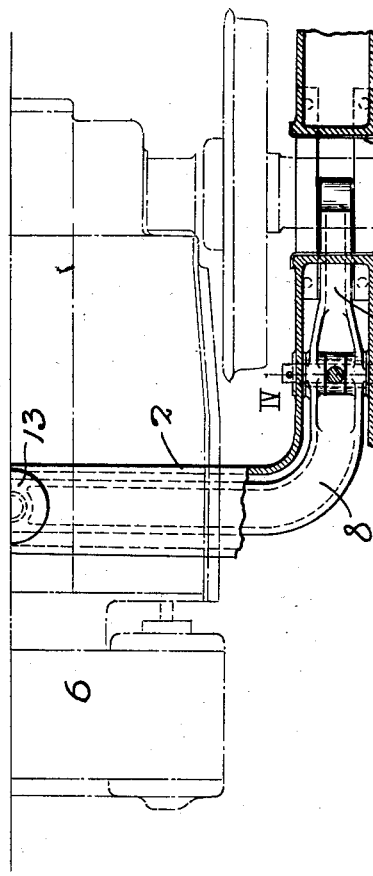
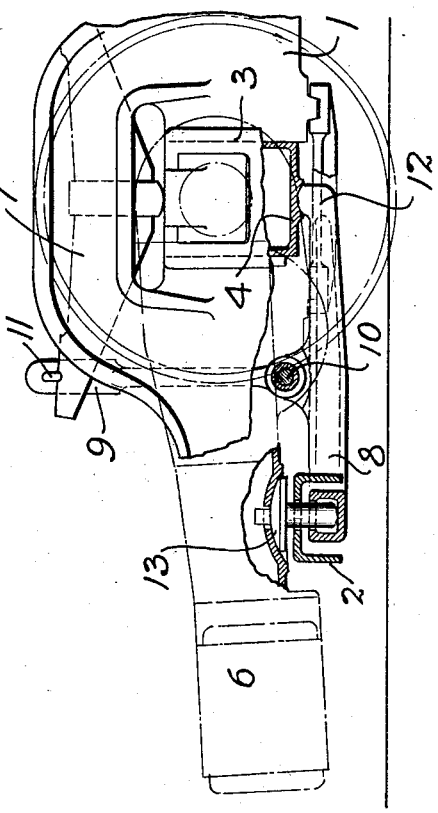
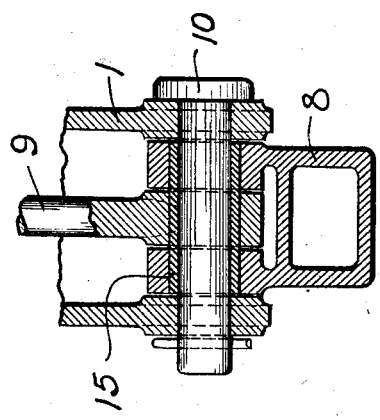
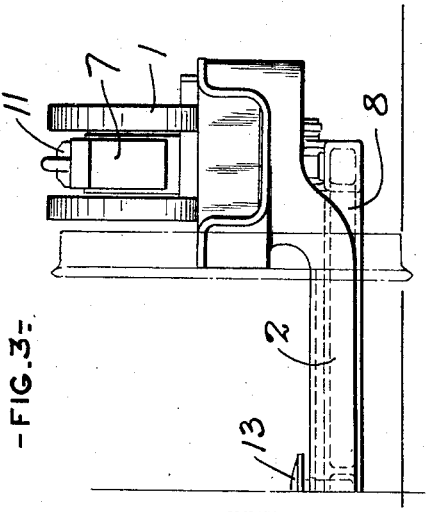
INVENTOR
Alfred W. Bruce
BY S. C. Yeaton
ATTORNEY Patented Feb. 17, 1931

1,793,049

UNITED STATES PATENT OFFICE

ALFRED W. BRUCE, OF NEW YORK, N. Y.

LOCOMOTIVE BOOSTER SUSPENSION

Application filed June 1, 1929. Serial No. 367,738.

This invention relates generally to railway locomotives, and more particularly to supports for booster motors commonly applied to the trailing trucks of such locomotives.

An object of the invention is to provide a support for booster motors whereby said motor may be suspended from the spring system of the locomotive wholly independently of the truck frame, or the main frame of the locomotive. Another object of the invention is to utilize a cross equalizer of a system of equalized spring suspension, to support a booster motor and maintain it in alignment with the axle with which it is associated, in such a manner that no additional stress will be imposed thereby on the frame of the truck in which it is incorporated.

The improvement claimed is hereinafter fully set forth.

In the accompanying drawing: Figure 1 is a side view, partially in section, of a portion of a trailing truck to which the invention is applied; Fig. 2, a half plan view, partially in section, of the same; Fig. 3, a half rear view of a portion of the truck; and, Fig. 4, is an enlarged section in elevation, on the line IV—IV of Fig. 2.

In the practice of the invention, referring descriptively to the specific embodiment thereof which is herein exemplified, the trailing truck comprises the side members 1, in which are formed pedestals 3, for the reception of the journal boxes 4, mounted on the axle 5, to which latter member is operatively connected the booster motor 6.

The side members 1, are usually joined by the cross member 2, frequently formed integral therewith. Mounted on the axle box 4, is the leaf spring 7, connected at its forward end to an equalizer, and at its rearward end to the cross equalizer 8, by means of the spring hanger 9, through which passes, at its upper portion, the gib 11, and at its lower end, is bored for the reception of the pin 10, said pin passing through the frame 1, the cross equalizer 8, and the hanger 9, as shown in Fig. 4.

The cross equalizer 8 is substantially U-shaped in form, and has its extremities 12, adapted to be seated in suitable receptacles formed on the bottom of the journal box 4. Midway of its transverse length is mounted the pivotal means 13, adapted to support the booster motor 6, on the equalizer 8, the frame member 2, being suitably apertured to permit the shank of the pivotal means 13, to pass freely therethrough.

A preferred form of construction illustrated in Fig. 4, has a tubular bushing 15 mounted in the hanger 9 and the equalizer 8, the pin 10, being adapted to pass conjointly through the said bushing 15 and the truck frame side members 1.

It is thus seen that the support of the booster motor 6, is accomplished by the interaction of the leaf spring 7, the hanger 9, the cross equalizer 8, and the journal box 4, all acting wholly independently of the truck frame 1, or the main frame of the locomotive, and that the disposition of the parts is such as to ensure the alignment of said booster motor with its cooperant axle.

The invention claimed and desired to be secured by Letters Patent is:

1. The combination of a booster driven axle, journal boxes therefor, springs mounted on the journal boxes, and a booster motor support seated on the journal boxes and supported by the said springs.

2. The combination of a booster driven axle, journal boxes therefor, springs mounted on the journal boxes, and a booster motor support seated on the journal boxes.

3. The combination of a booster driven axle, journal boxes therefor, springs mounted on the journal boxes, and a booster motor support pivotally bearing on the journal boxes and supported by the said springs.

4. In a locomotive, a trailer axle, a booster motor operatively connected to the axle, journal boxes on the axle, springs mounted on the journal boxes, and means pivotally bearing on the journal boxes and connected to the springs for supporting said booster motor.

5. In a locomotive, a trailer axle, a booster motor operatively connected to the axle, journal boxes on the axle, springs mounted on the journal boxes, and means pivotally engaging the motor and the journal boxes for supporting the motor from said springs and journal boxes.

6. In a locomotive, a truck including an axle, journal boxes on the axle, a booster motor operatively connected with the axle, a truck frame, and springs and an associated cross equalizer interposed between the journal boxes and the frame, the said cross equalizer supporting the booster motor and bearing on the journal boxes.

7. A spring supporting system for a locomotive having a booster motor, comprising leaf springs and a cross-equalizer operably connected with said springs and adapted for supporting the booster motor.

8. A booster motor, an axle driven thereby, journal boxes mounted on the axle, and an equalizer system from which the axle receives its load, said equalizer system including a cross equalizer supporting the booster motor and pivotally bearing on the journal boxes.

9. In a locomotive, a booster motor, an axle driven thereby, boxes for the axle, means for transmitting the axle carrying load to the upper faces of the boxes, means for unbalancingly supporting the motor, and means engaging the lower faces of the boxes whereby said faces resist the unbalanced weight of the motor.

10. A booster motor carrying member, adapted to partly support a booster motor of a locomotive, said member being adapted to be fulcrumed on equalizing system members of the locomotive, one end of said carrying member being adapted for supporting the booster motor and the other end for transmitting the load to the axle boxes of the booster driven axle of the locomotive.

11. In a locomotive, the combination of a booster motor, booster motor driven axle boxes, and an equalizing system, comprising springs supported on the boxes, equalizing hangers secured to the springs, and a booster motor supporting U-shaped member connected to the hangers.

12. In a locomotive, a booster motor support, comprising an equalizing system hanger, a booster motor support connected to the hanger, and means independent of the connection between the hanger and support for connecting the hanger to the load carrying structure of the locomotive.

13. In a locomotive, a truck frame, a booster motor, equalizer hangers, a booster motor support, hollow connections connecting the support with the hangers, and pins extending through the hollow supports and connected to the frame.

14. In a truck for locomotives, the combination of a frame comprising side frame members, each having a pair of pedestal jaws; an axle; a journal box fitted in each pair of pedestal jaws and mounted on the axle; a spring mounted on top of each journal box; means for supporting the frame on the springs; a booster motor for driving the axle; and means for supporting the booster motor comprising a transverse member pivotally connected to the booster motor, and two longitudinal arms, each arm being pivotally connected intermediate its length to one of the side frame members, and bearing at its forward end on one of the journal boxes.

ALFRED W. BRUCE.